United States Patent [19]

Hart

[11] Patent Number: 5,228,182

[45] Date of Patent: Jul. 20, 1993

[54] AXLE HOUSING REPAIR APPARATUS AND METHOD FOR REPLACING A VEHICLE AXLE TUBE ASSEMBLY

[76] Inventor: Arthur J. Hart, 10255 E. Via Linda, #2005, P.O. Box 12342, Scottsdale, Ariz. 85267

[21] Appl. No.: 816,484

[22] Filed: Jan. 6, 1992

[51] Int. Cl.5 .......................................... B23P 19/04
[52] U.S. Cl. ................................... 29/402.08; 29/252
[58] Field of Search ............... 29/402.03, 402.08, 252, 29/281.1, 251; 269/296, 37, 43, 55, 902

[56] References Cited

U.S. PATENT DOCUMENTS

| | | | |
|---|---|---|---|
| 3,962,796 | 6/1976 | Johnston | 33/288 |
| 4,055,899 | 11/1977 | Dean | 33/193 |
| 4,261,597 | 4/1981 | Vandenberg | 280/688 |
| 4,347,668 | 9/1982 | Johnston | 33/193 |
| 4,440,495 | 4/1984 | Bergstöm et al. | 356/155 |
| 4,477,956 | 10/1984 | Mefford | 29/252 |
| 4,558,502 | 12/1985 | Gössmann et al. | 29/252 X |
| 4,571,807 | 2/1986 | Hines et al. | 29/252 |
| 4,763,394 | 8/1988 | Decato et al. | 29/252 |
| 4,942,667 | 7/1990 | Fournier | 33/288 |
| 4,958,424 | 9/1990 | Hsu et al. | 29/252 |

*Primary Examiner*—Timothy V. Eley
*Attorney, Agent, or Firm*—Rosenbaum & Schwartz

[57] ABSTRACT

The present invention is an apparatus used to replace an axle housing for a light duty truck. The device consists of a frame which includes supports to hold axle housing tube assemblies and a differential mechanism housing. The apparatus includes a push rod attached to a hydraulic or mechanical press or ram. A collar is attached to the push rod. The push rod extends through the first axle tube assembly and the differential housing and the collar is placed against the circumference of the second axle tube assembly. In operation the ram is activated and the second axle tube assembly is forced apart from the differential housing so that a replacement axle tube assembly can be attached to the differential housing.

21 Claims, 6 Drawing Sheets

AXLE HOUSING REPAIR APPARATUS AND METHOD FOR REPLACING A VEHICLE AXLE TUBE ASSEMBLY

BACKGROUND OF THE INVENTION

The current invention relates to the field of devices to repair defective, worn or damaged vehicle parts, specifically vehicle axle housings.

On many motorized vehicles the axle housing consists of two axle housing tube assemblies, also referred to as axle tube assemblies, and a center component that houses the gearing for the differential, referred to as the differential housing. An axle tube assembly further comprises a tube and spindle In the automotive industry these components when assembled together are generally referred to as the axle. The axle tube assemblies contain bearings which over a period of time and use become worn and need to be replaced.

Further, vehicles are involved in accidents which result in damage to the axle or axle housing which requires removal and replacement of the axle housing.

There is currently no known accepted way to replace an axle housing tube assembly.

One known method for replacing worn out axle tube assemblies on a vehicle is to remove the end of the axle housing containing the worn section by cutting off the axle tube spindle with a torch. A replacement tube section containing the correct tube and spindle of another axle housing is found and similarly removed. The replacement section is then welded to the first axle housing. This method has the drawback that it relies on the integrity of the welds to support the axle housing and consequently the axle. This method is not recommended by any axle housing manufacturer and its safety is questionable.

SUMMARY OF THE INVENTION

The present invention is an apparatus used to remove the defective axle housing tube assembly and allow a replacement to be attached to the differential housing. The present invention supports both the tube assemblies and the differential housing. In use, a push rod is placed through the first axle housing tube and the differential housing. A collar is then attached to the push rod. The collar is sized to match the circumference and inner bore diameter of the second axle housing tube. A hydraulic ram is then used to force the axle housing tube to separate from the differential housing so that a replacement axle housing tube can be installed.

It is an object of the present invention to provide an apparatus to allow for the removal of a damaged or defective axle housing tube from a differential housing to allow for the damaged or defective axle housing to be replaced.

It is a further object of the invention to allow for the safe and accurate repair and replacement of a damaged or defective axle housing.

It is still a further object of the invention to provide an apparatus that also allows for the repair of a bent or warped axle housing.

It is yet a further object of the invention to provide for the proper alignment of an axle housing relative to a differential housing.

DETAILED DESCRIPTION OF THE INVENTION

Figure 1:
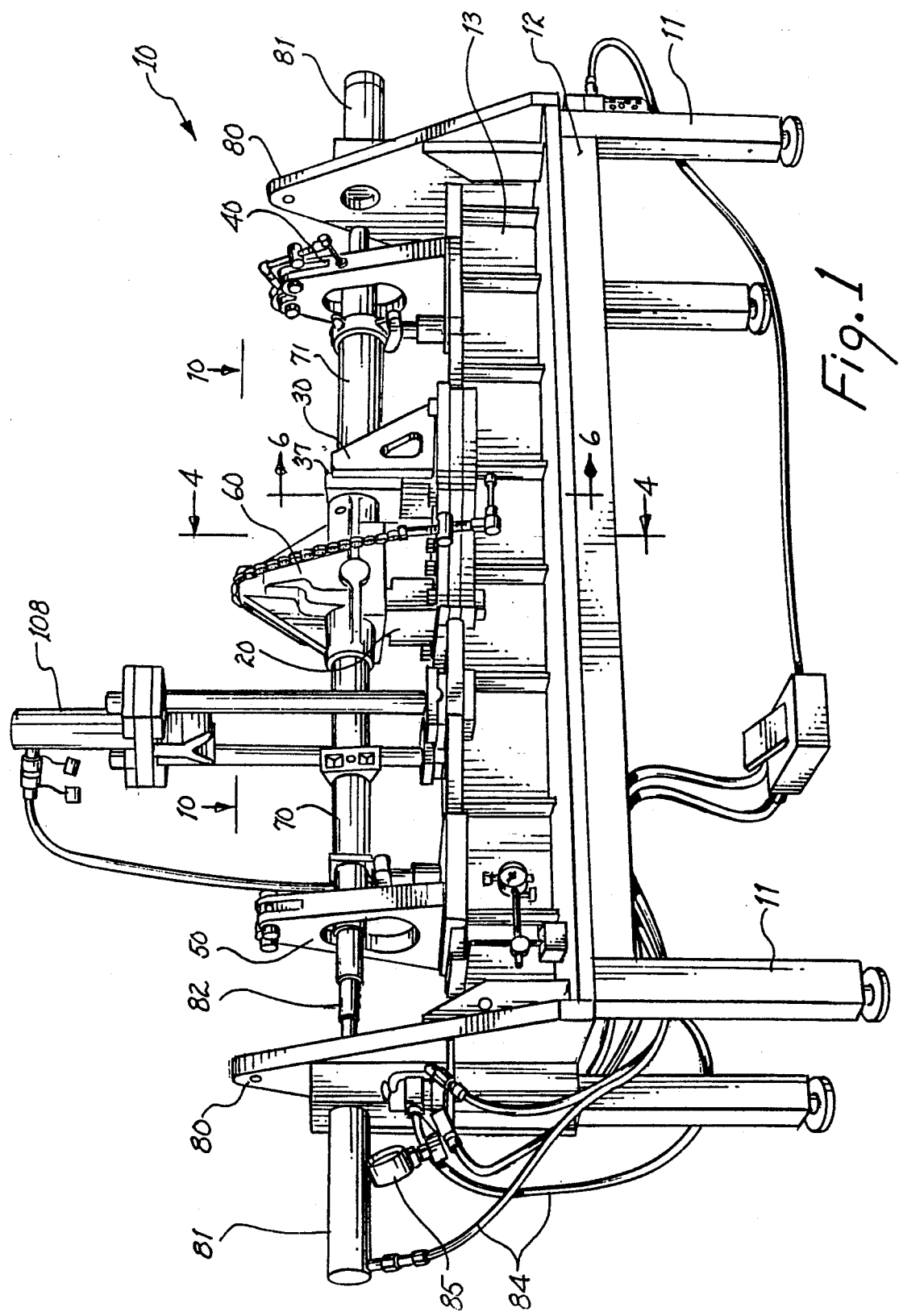
FIG. 1 is a perspective view of an axle housing repair apparatus of the current invention.

The present invention consists of an apparatus to allow for the removal of a damaged or defective axle housing tube assembly so that a replacement axle housing can be provided.

Referring to FIGS. and 2, the invention 10 consists generally of a base 12 supported by legs 11. Incorporated into the base is a rail 13 substantially in the shape of an I-beam. The rail 13 has a top surface 14. Various supports can be attached to the surface 14 of the rail so that they can be selectively positioned as needed for working on various length axle housings.

Referring to again to FIGS. 1 and 2, placed on top of the rail 13 are several components of the apparatus including the differential holding tool 20, the differential support 30, and a pair of steady rests, 40 and 50. All of these components gave a smooth flat base 21, 31, 41 and 51, as shown in FIGS. 4, 6, 7 and 9 respectively, which rides along the surface of rail 13. These components further have a lip 22, 32, 42 and 52 respectively that engages the edge of rail 13 to prevent movement of any of these components in any direction other than in the direction of the rail. Lip 23, 32, 42 and 52 further incorporate a locking mechanism which tensions the lip onto the rail 13, whereby releasing the locking mechanism permits the component to move along the rail. When the tension on the locking mechanism is increased the component will be held firmly in position on the rail. Appropriate locking mechanisms are known in the art, such as a nut and bolt arrangement shown in the Figures.

Other types of mechanisms to allow for movement and firm placement of the components along the rail could also be used. These include regularly spaced holes on the rail, and dowels placed in holes on the components, and into the rail, to hold the components in place. These dowels could be hydraulically or pneumatically controlled. Other types of clamping mechanisms could also be used.

Figure 3:
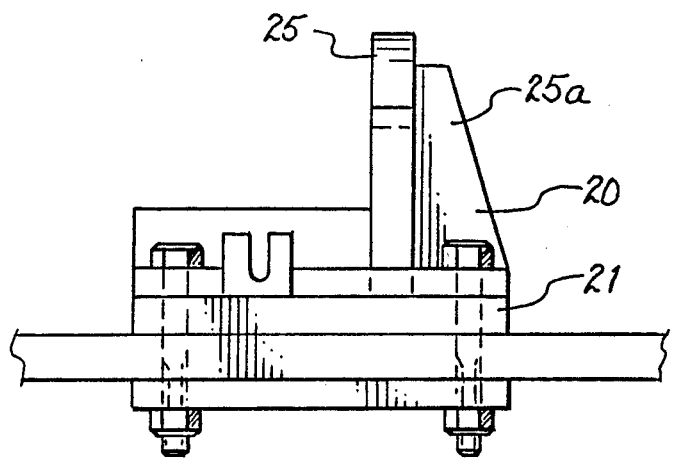
FIG. 3 is a side elevational view of a differential holding tool of the invention apparatus.
Figure 4:
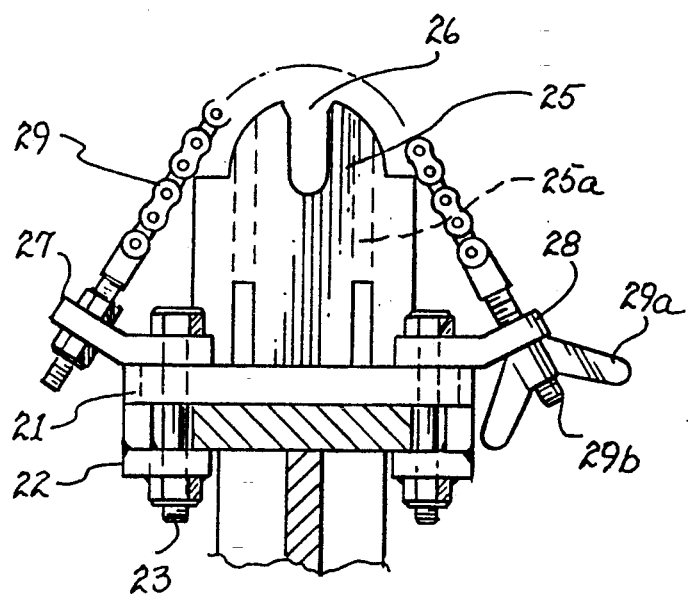
FIG. 4 is a cross-sectional view taken along line 4—4 of FIG. 1.

Referring to FIG. 3 and FIG. 4, the differential holding tool 24 further consists of a metal support 25 which is designed to engage the inside of the open differential housing 60, after the differential gears have been removed. This support has a U-shaped opening 26 adapted to allow a push rod 82 to pass through it. Differential holding tool 20 further contains two anchor posts 27 and 28 onto which a chain or strap is anchored. In use the chain or strap 29 is passed over the differential housing 60 and terminates in a bolt 29b. This bolt 29b passes through anchor post 28. A ratchet or wing nut 29a is attached to the bolt and tension is applied to it to hold the differential housing 60 firmly in place.

The metal support 25 of the differential holding tool 20 can be a permanent component or can be a removable and replaceable component. It is preferable for this support 25 to be removable so that different sized supports can be used for various differential housings. The support 25 is designed so that its upper surface engages the inner surface of the differential housing 60. Further, the differential holding tool 20 can use one or multiple supports so that the supports are of the proper size and shape to properly engage the differential housing 60. The support 25 is designed so that it fits into and firmly engages base 21 and is further supported by a pair of vertical braces 25a against lateral or side load displacement.

Figure 2:
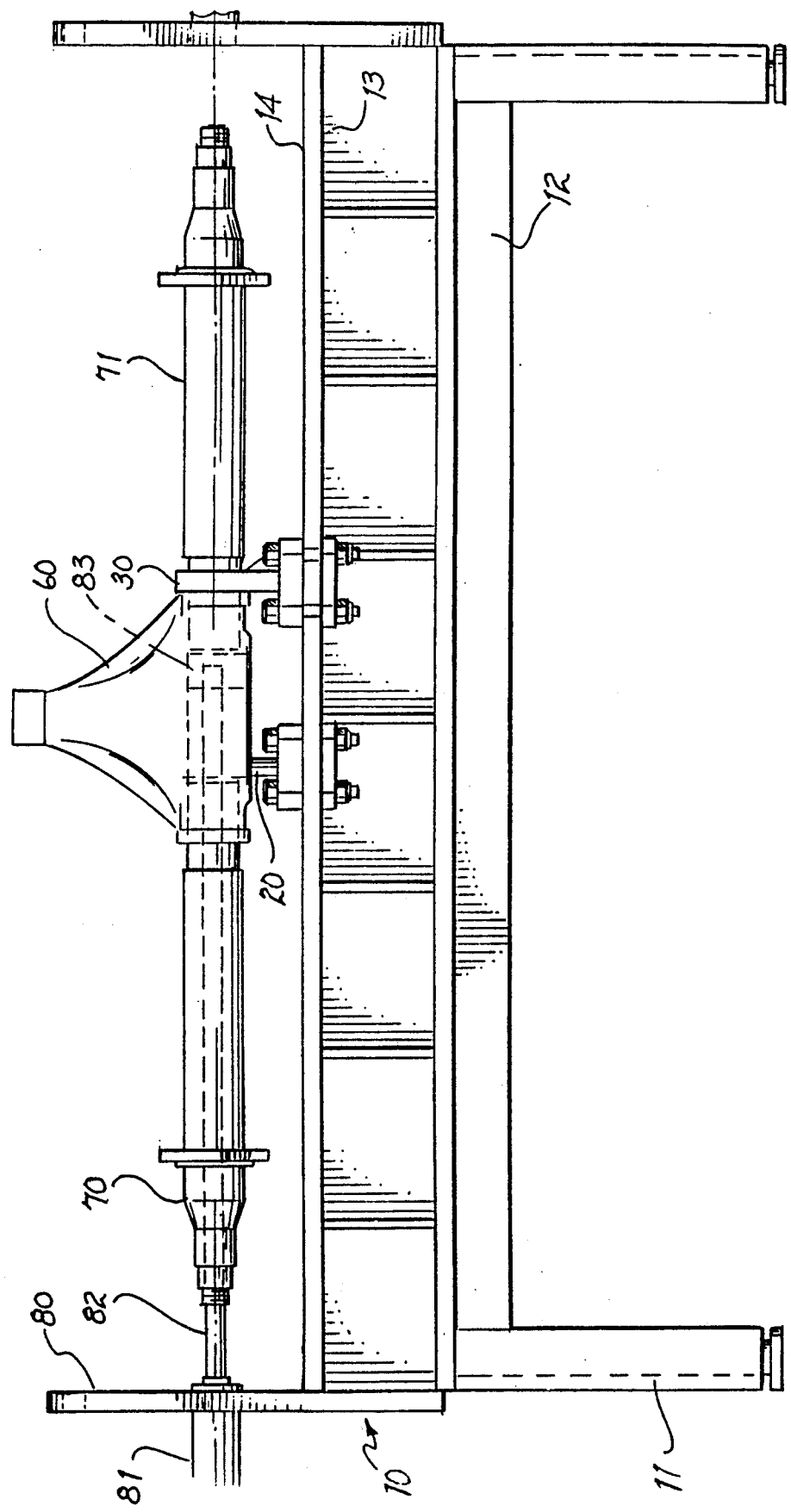
FIG. 2 is a side elevational view of the axle housing repair apparatus.
Figure 5:
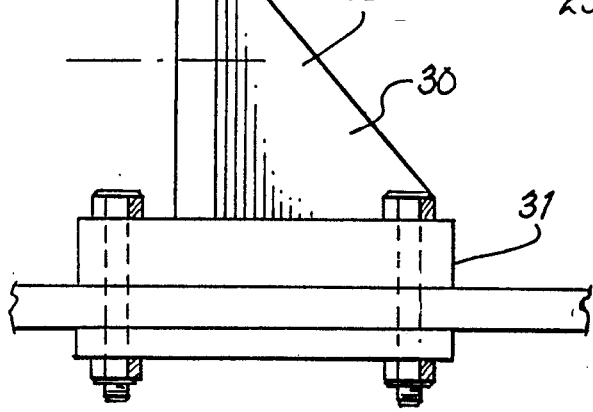
FIG. 5 is a side elevational view of a differential support member of the current invention.
Figure 6:
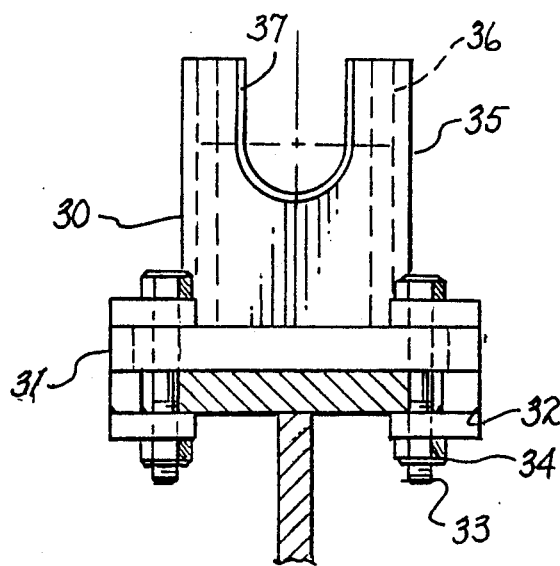
FIG. 6 is a cross sectional view taken along line 6—6 of FIG. 1.

A second component shown placed on the rail 13, as shown in FIGS. 1 and 2, is the differential support 30. This component is shown in detail in FIGS. 5 and 6. This differential support 30 incorporates the base 31 and lip 32 common to all the components used on the rail. The differential support 50 further contains a vertical metal support 35 supported by a pair of braces 36. The vertical support 35 is designed to accept a collet 37 shaped to engage and support the edge of the differential support 30. The differential support 30 is designed so that various size collets can be used and the collars are easily interchangeable to accommodate various size differential housings. A collet is selected so that it will be of the proper size to match the circumference of the differential housing 30 at the point where it meets the axle housing. In use, this collet will support the differential housing 30 when force is applied to the axle housing by the push rod 82. Concentrated force applied to this area eliminates any undue pressures on the bearing surfaces, maintaining the geometry of the differential housing 30.

Two steady rests 40 and 50 are also components which are placed on the rail. These steady rests 40, 50 are shown in detail in FIGS. 7, 8 and 9. The steady rests 40, 50 include the base 41 and 51, and the lips, 42 and 52, which are included in all components which attach to the rail 13. The steady rest 40 includes two vertical members 55 which are substantially parallel with only a small distance separating them. On the top of these members 55 are free turning wheels 110, which are placed in the space separating the vertical members 55. The use of these wheels 110 will be described later. Vertical members 55 contain a circular opening 56. These openings allow the axle housings 70 and 71 or the push rod 82 to pass through the vertical members 55. The steady rests 40, 50 also contain a vertical support 57. This support 57 contains an adjustable mechanism 58, such as a threaded member, which allows the height of this support 57 to be adjusted to meet and support the axle housing 70.

Referring again to FIGS. 1, attached to the base 12 are two vertical end supports 80. These end supports 80 serve as a frame to attach hydraulic cables 84 and related items such as gauges 85. The hydraulic cylinders 81 are also attached to these supports 80. If mechanical presses, rather than hydraulic presses were used, these would also be attached to the end supports 80.

When it is necessary to remove an axle tube assembly 71 from the differential housing 60, the axle and the differential gears are first removed from the axle housing tube assembly 71 and the differential housing 60. The differential housing 60 is then prepared by drilling through the points where the axle housing tube assembly 71 and differential housing 60 have previously been welded together. Drilling out the welds makes removal of the axle housing tube assemblies 71 easier.

Prior to placing the housings 60, 71 on apparatus 10, differential holding tool 20 is placed on the rail 13 and the properly sized support 25 is placed on the differential holding tool 20. The proper a size collet 37 is selected for differential support 30 and set in place on vertical brace 36.

The differential housing 60 with the attached axle housing tube assembly 71 is then placed on apparatus 10. The differential housing 60 is placed on the differential holding tool 20, which was previously secured into place on rail 13. The differential housing 60 is then secured into place with chain 29 and secured by tightening wing nut 29b. Steady rests 40 and 50 are set in place and secured by tightening bolts 43 and 53. Supports 48 and 58 are adjusted to the proper height to support axle housings 70 and 71.

Differential support 30 is then placed into position. The differential support 30 is placed so that collet 37 is placed firmly against the edge 61 of the differential housing 60.

Figure 10:
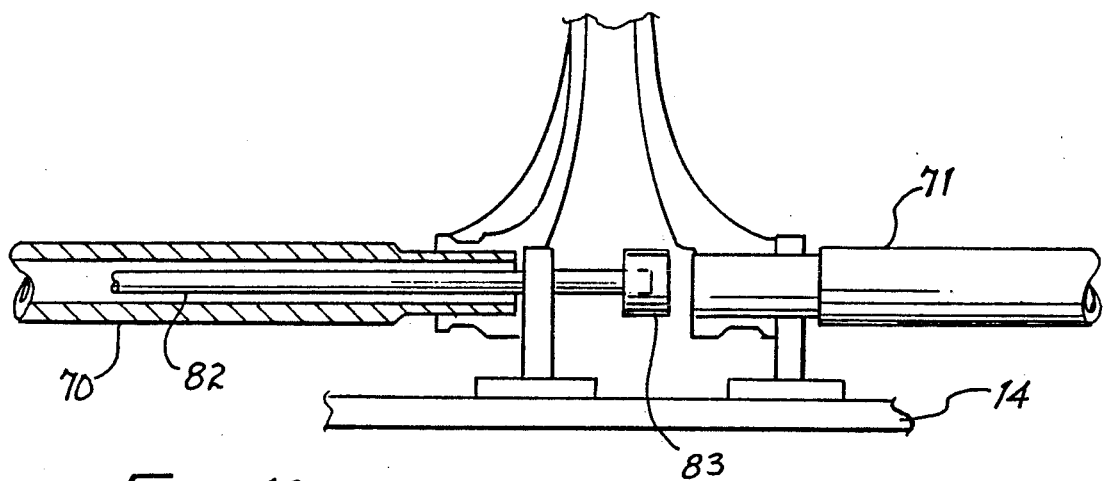
FIG. 10 is a cross sectional view taken along line 10—10 of FIG. 1.

A push rod 82 is then inserted through axle housing 70 and is connected at one end to hydraulic cylinder 81. The push rod is of sufficient length so that it extends into an open portion of differential housing 60. A collar 83 is then attached to the end of the push rod 82 which is accessible through the open differential housing 60. The push rod 82 and collar 83 are shown in a partial section in FIG. 10. The collar 83 is selected so that its circumference matches the circumference of axle housing tube assembly 71. The circumference of axle housing tube assembly 71 is smaller than the interior circumference of differential housing 60 at their junction.

The hydraulic cylinder 81 is then activated so that the push rod 82 applies pressure to the axle housing tube assembly 71 forcing the axle housing tube assembly 71 to be separated from differential housing 60.

When the damaged axle housing tube assembly 71 is removed a new axle housing tube assembly can be attached to differential housing 60. The differential housing 60 can be repaired, if necessary, prior to attaching a new axle housing tube assembly to the differential housing 60. While the differential housing 60 is in place, the bearing surface could be restored to a flat surface, which is commonly recommended, since the bearing surface is often worn. A hydraulic or mechanical press can be used to assist in putting the replacement axle housing tube assembly, into place. Once the replacement axle housing tube assembly is inserted into the differential housing 60 it is welded into place. It is also common practice to put a new bearing kit into the differential housing 60. The axle and differential gears can then be replaced.

Figure 11:
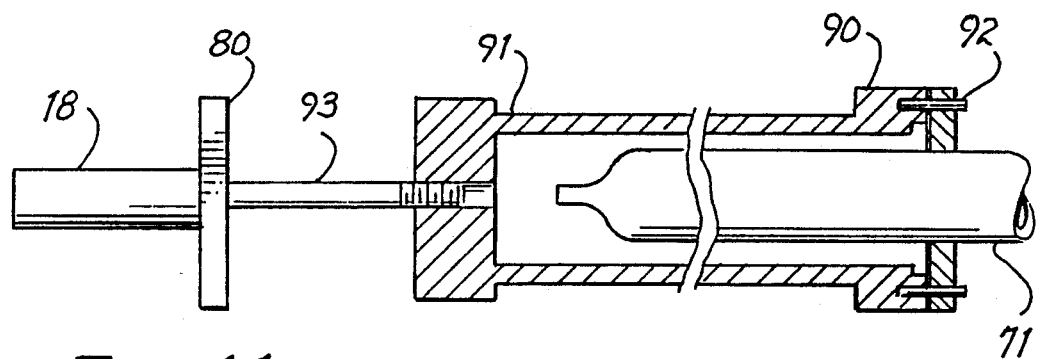
FIG. 11 is an overhead sectional view of a second embodiment of the current invention.

In a second embodiment of the current invention, the differential housing 60 with the attached axle housing tube assemblies 71 is placed on the apparatus in the same manner as in the first embodiment described above. The differential housing 60 is securely on the differential support 30 and the differential holding tool 20. The differential housing 60 is secured into place by tightening the chain 29 attached to the differential holding tool 20. However, instead of a push rod 82 being placed through the differential housing 60 a hollow cylindrical collar 90 is placed over the end of the axle housing tube assembly 71 and is attached to a brake spider 91 by means of four bolts 92, as shown in FIG. 11. A four bolt brake spider 90 is common to light duty truck axle housings. A pull rod 93 is then attached to the collar 91 and then to the hydraulic or mechanical press 81. The press 81 is then activated to apply a force away from the differential housing 60, which forces the axle housing tube assembly 71 to separate from the differential housing 60. This embodiment of the invention allows the axle housing tube assembly 71 to be removed from the differential housing 60 in the event of a broken axle shaft which cannot be removed from the axle housing tube assembly 71.

Figure 13:
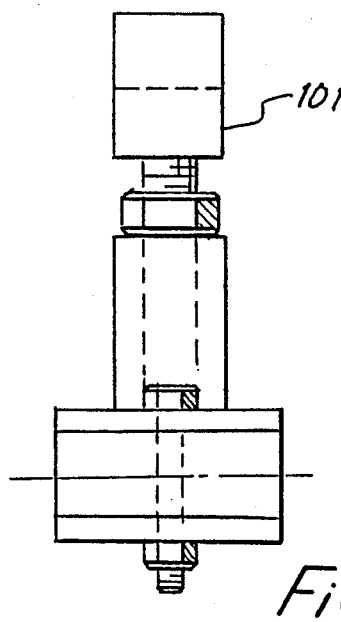
FIG. 13 is a side elevational view of the press stand assembly.
Figure 12:
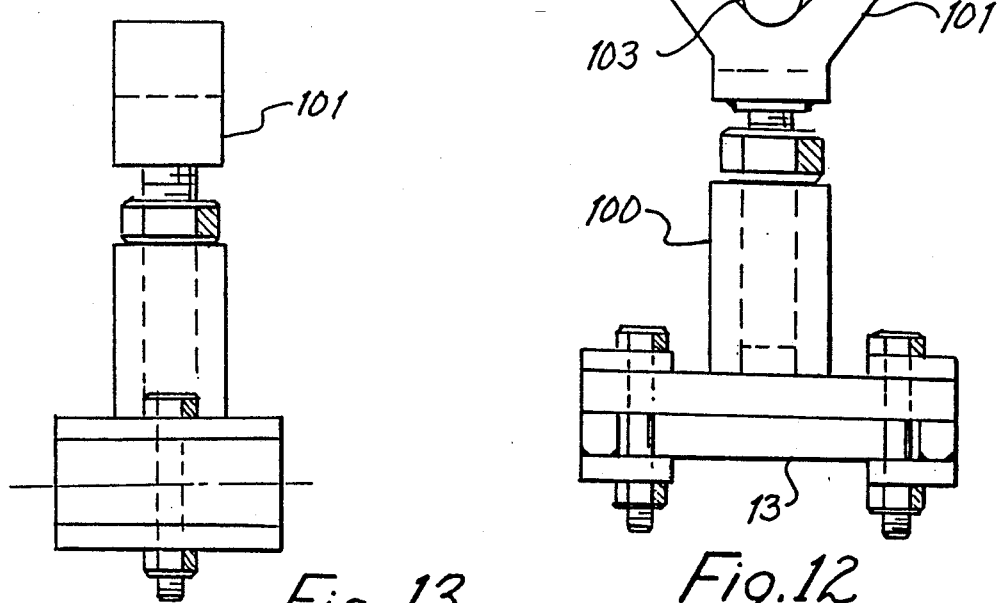
FIG. 12 is an end elevational view of a press stand assembly usable with the axle housing repair apparatus of the current invention.
Figures 14, 15:
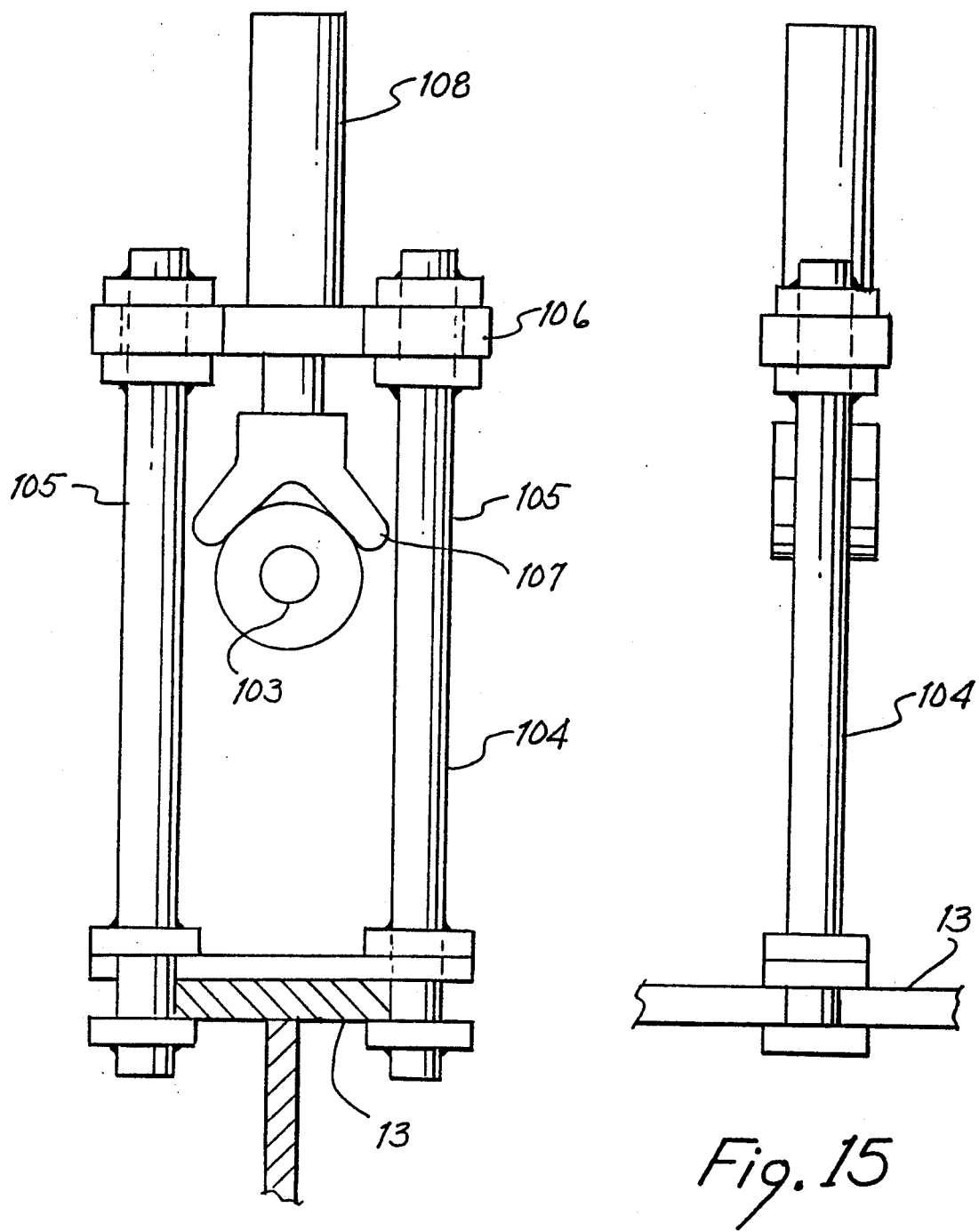
FIG. 14 is an end view of a straightening press assembly of the current invention.
FIG. 15 is a side elevational view of the straightening press assembly of the present invention.

The present invention also permits other repairs to be performed on the invention. The apparatus is designed to permit straightening of warped or bent axles. A bent axle 103 would be placed on press stands 100, shown in FIGS. 12 and 13. The press stands are designed to ride in the I-beam support rail 13. The press stand contains a Y-shaped member 101 onto which the axle is placed. The axle is placed on two press stands 100 placed apart from each other. Between the press stands 100 a hydraulic or mechanical straightening press 104 would be placed. The straightening press 104 is shown in detail in FIG. 14 and 15. The straightening press 104 rides on the same I-beam support rail 13 as the press stands 100 and can be moved into any position necessary along the rail 13, however, the straightening press 104 should be placed between the two press stands 101 when it is in use. The press consists of two vertical supports 105 which support a horizontal support member 106. A hydraulic cylinder 108 is attached to the horizontal support member 106. An inverted Y-shaped member 107 is attached to the hydraulic cylinder 108 which extends down from the horizontal support member 106. In use, the hydraulic cylinder 108 is activated so that the inverted Y-shaped member 107 contacts the axle 103 and provides a force to straighten the deformed axle 103.

Figure 7:
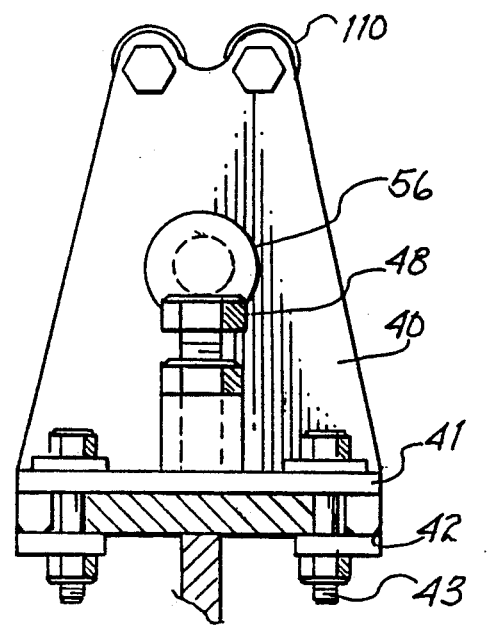
FIG. 7 is an end elevational view of a first steady rest member of the present invention.
Figure 9:
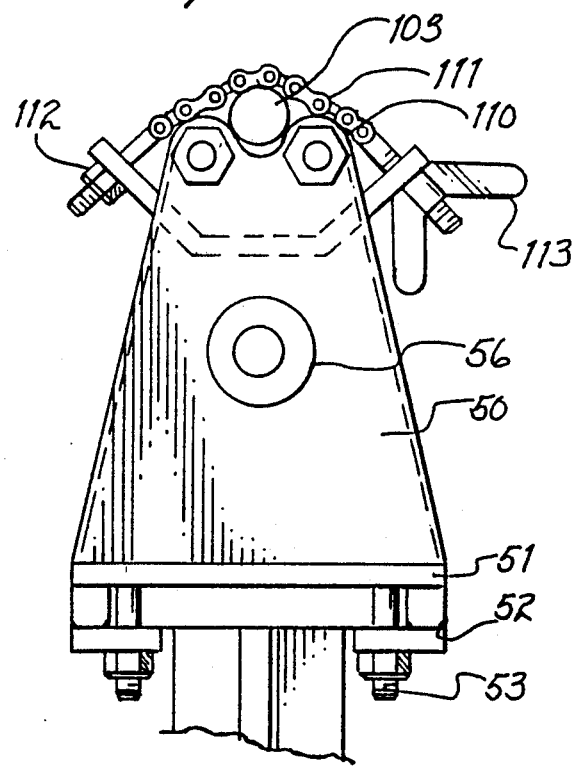
FIG. 9 is an end elevational view of a second steady rest member of the present invention.
Figure 8:
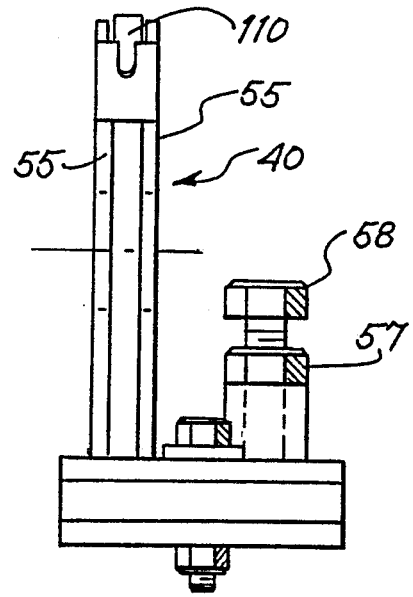
FIG. 8 is a side view of the steady rest member.

The steady rests 40 and 50 as shown in FIGS. 7–9 include rollers 110 on the top of them. These rollers allow an axle 103 to be placed on the rollers 110 for testing purposes, specifically dial indication, to determine if the axle is straight. In use, an axle 103 is placed on the rollers 110 and a dial indicator is placed next to the axle 103, on a section of the axle located then placed on apparatus 10. The differential housing 60 is placed between the two steady rests 40 and 50. The axle 103 is rotated and the dial indicator indicates if the axle 103 is not straight. If the axle 103 is not straight it can be straightened by the straightening press 104 as described above. The steady rest 50 includes a chain 111 attached to an anchor nut 112 and a wing nut 113. The chain 111 is placed over the axle 103 and tightened by wing nut 113 to securely hold the axle 103 in place when on the steady rest 50. Other known methods could be used to secure the axle 103 in place on the rollers 110 of the steady rest 50.

While the invention has been described with reference to the preferred embodiments thereof, those skilled in the art will understand that variations in design, detail, size, shape, and choice of materials for manufacture may be made and still fall within the spirit and scope of the present invention, which is intended to be limited only by the claims appended hereto.

I claim:

1. A method for replacing a vehicle axle tube assembly including:
    removing differential gears from a differential housing;
    removing an axle shaft from at least one axle tube assembly which is attached to said differential housing;
    drilling through welds which attach the axle tube assembly to said differential housing;
    placing said axle tube assembly and differential housing upon an apparatus to support said housings;
    placing a push rod through said differential housing;
    positioning said push rod in a position to apply a force against said axle tube assembly;
    applying a force to said push rod against said axle tube assembly thereby causing said axle tube assembly to separate from said differential housing;
    removing said axle tube assembly;
    replacing said axle tube assembly with a replacement axle tube assembly;
    welding said replacement axle tube assembly to said differential housing.

2. The method of claim 1 wherein said force is applied to said axle tube assembly by a hydraulic ram.

3. An axle housing repair apparatus including:
    means for supporting a vehicle differential housing comprising at least one vertical member having a top edge, said top edge being generally U-shaped for engaging the vehicle differential housing;
    means for supporting at least one axle tube assembly attached to the differential housing;
    a push rod, said push rod being insertable through the differential housing for engaging the axle tube assembly; and
    means for applying a force to said push rod to separate said axle tube assembly from said differential housing.

4. The apparatus of claim 3 wherein said means for applying a force to said push rod comprises a hydraulic press.

5. The apparatus of claim 3 wherein said means for applying a force to said push rod comprises a mechanical press.

6. The apparatus of claim 3 wherein said means for supporting a vehicle differential housing further comprises a horizontal rail supported by multiple legs for movably engaging said vertical member.

7. The apparatus of claim 3 wherein said at least one vertical member further comprises a plurality of interchangeable collets for engaging the top edge of said at least one vertical member, said plurality of collets being made of various sizes to accommodate various sized differential housings.

8. The apparatus of claim 3 wherein said means for supporting a vehicle differential housing further comprises at lease one support piece for engaging at least one of a front surface and back surface of said at least one vertical member.

9. The apparatus of claim 3, wherein said means for supporting at least one axle tube assembly comprises at least two interchangeable steady rests each comprising two vertical members separated by a space and free turning wheels located within said space near a top end of said vertical members.

10. The apparatus of claim 3, wherein said at least one vertical member supports an internal portion of said vehicle differential housing.

11. The apparatus of claim 3, wherein said at least one vertical member supports an external portion of said vehicle differential housing.

12. The apparatus of claim 3 wherein said apparatus further comprises a straightening press for straightening a bent axle, said straightening press being movably engaged to said axle housing repair apparatus.

13. An axle housing repair apparatus including:
  means for supporting a vehicle differential housing;
  means for supporting at least one axle tube assembly attached to the differential housing;
  a push rod which is placed through the differential housing;
  a collar removably attached to an end of said push rod, said collar being of a same circumference as said axle tube assembly;
  means for applying a force to said push rod to separate said axle tube assembly from said differential housing.

14. The apparatus of claim 13 wherein said means for applying a force to said push rod comprises a hydraulic ram.

15. The apparatus of claim 13 wherein said means for applying a force to said push rod comprises a mechanical ram.

16. The apparatus of claim 13 wherein said means for supporting a vehicle differential housing further comprises a horizontal rail supported by multiple legs and a vertical member which movably engages the horizontal rail, said vertical member designed to engage a vehicle differential housing.

17. The apparatus of claim 16 wherein said means for supporting an axle housing further comprises a Y-shaped member which engages the horizontal rail.

18. An axle housing repair apparatus including:
  means for supporting a vehicle differential housing;
  means for supporting at least one axle tube assembly attached to the differential housing;
  means for applying a force to said axle tube assembly, said force being sufficient to separate said axle tube assembly from said differential housing;
  means for securing engaging said axle tube assembly to said means for applying a force to said axle tube assembly.

19. The apparatus of claim 18 wherein said means for applying a force to said axle housing comprises a hydraulic ram.

20. The apparatus of claim 18 wherein said means for applying a force to said axle tube assembly comprises a mechanical ram.

21. The apparatus of claim 19 wherein said means for securely engaging said axle tube assembly to said means for applying a force to said axle tube assembly further comprises an adaptor attached to a brake spider of an axle tube assembly and attached to said hydraulic ram.

* * * * *